US012603666B2

(12) United States Patent
Guillou et al.

(10) Patent No.: US 12,603,666 B2
(45) Date of Patent: Apr. 14, 2026

(54) IFF/ADS-B RECEPTION CHAIN

(71) Applicant: THALES, Meudon (FR)

(72) Inventors: Ewen Guillou, Cholet (FR); Laure Hogommat-Chabrot, Laval (FR)

(73) Assignee: THALES, Meudon (FR)

( * ) Notice: Subject to any disclaimer, the term of this patent is extended or adjusted under 35 U.S.C. 154(b) by 327 days.

(21) Appl. No.: 18/399,446

(22) Filed: Dec. 28, 2023

(65) Prior Publication Data

US 2024/0223230 A1 Jul. 4, 2024

(30) Foreign Application Priority Data

Dec. 29, 2022 (FR) ...................................... 2214616

(51) Int. Cl.
H04B 1/10 (2006.01)
H04B 1/00 (2006.01)

(52) U.S. Cl.
CPC ......... H04B 1/1018 (2013.01); H04B 1/0057 (2013.01)

(58) Field of Classification Search
CPC ...... H04B 1/1018; H04B 1/0057; G08G 5/55; G08G 5/22; G08G 5/26; G08G 5/53; G08G 5/56; G08G 5/727; G01S 7/4021; G01S 13/91; G01S 13/93; G01S 13/78
See application file for complete search history.

(56) References Cited

U.S. PATENT DOCUMENTS

2003/0233192 A1 12/2003 Bayh et al.
2019/0391228 A1* 12/2019 Billaud .................. G01S 7/021
2022/0035021 A1* 2/2022 Billaud .................... G08G 5/25

FOREIGN PATENT DOCUMENTS

CN 109 379 102 A 2/2019
FR 3 109 451 A1 10/2021

OTHER PUBLICATIONS

Mansour, et al., "Multiband superconducting filters", 2016 IEEE MTT-S International Microwave Symposium (IMS), 2016.
Helfrick, "A surveillance receiver for evaluating mode A/C/S activity", Proceedings of 14th Digital Avionics Systems Conference, pp. 13-18, 1995.

* cited by examiner

*Primary Examiner* — Matthew D. Anderson
(74) *Attorney, Agent, or Firm* — BakerHostetler

(57) ABSTRACT
A reception chain allowing the reception of IFF and ADS-B signals while rejecting at least one intermediate frequency band, includes a reception antenna, an analog part with: a two-band filtering device passing around the frequency bands of the IFF and ADS-B signals while rejecting the intermediate frequency band, a low-noise amplifier, a mixer configured to transpose the IFF and ADS-B signals to lower frequencies, an analog-digital converter, a digital part configured to duplicate the digitized signal, and to process the duplicated signals respectively on a first, IFF, path and a second, ADS-B, path each comprising a filtering device, a frequency transposition device, and signal processing means.

8 Claims, 2 Drawing Sheets

IFF/ADS-B RECEPTION CHAIN

CROSS-REFERENCE TO RELATED APPLICATION

This application claims priority to foreign French patent application No. FR 2214616, filed on Dec. 29, 2022, the disclosure of which is incorporated by reference in its entirety.

FIELD OF THE INVENTION

The invention applies to the field of air traffic control and anticollision devices for air traffic control. It relates more specifically to a reception chain configured to allow the simultaneous reception of IFF (acronym for Identification Friend or Foe) interrogations and ADS-B (acronym for Automatic Dependent Surveillance-Broadcast) interrogations, while ensuring strong constraints on rejection of third-party signals.

BACKGROUND

IFF is an encrypted aircraft identification system, allowing civil or military approach radars to recognise the airplanes that are cooperating, called «friends», and to determine their heading and distance. IFF is also used in flight in military airplanes to identify the friend and foe airplanes. The IFF interrogations are made by ground stations or aircraft on a frequency band centred around the 1030 MHz frequency, typically 14 MHz.

ADS-B is a cooperative surveillance system for air traffic control. An airplane equipped with ADS-B determines its position by a satellite positioning system (GNSS, acronym for Global Navigation Satellite System) and sends it periodically to the ground stations and to the other devices moving in proximity. The rate of transmission of the position depends on the phase of the flight. The ADS-B transmissions are made on a frequency band centred around the 1090 MHz frequency, typically of 16 MHz.

Most aircraft, in particular airplanes, embed equipment items that are necessary to implement these two standards, in particular the equipment items needed to listen for the IFF on the 1030 MHz frequency and the ADS-B on the 1090 MHZ frequency.

Such reception equipment items are subject to strong performance constraints by the standards DO-260 B or C (for ADS-B), AIMS 03-1000 (for IFF), and ED73 E or F (ADS-B). The constraints relate in particular to the minimum rejection levels for the reception radio chains. In particular, the rejection levels to be reached are very strong (greater than 60 dB) on the 1053 MHZ-1065 MHz band which is located between the reception frequency of IFF and that of ADS-B.

In order to address these strong rejection constraints, the aircrafts of the state-of-the-art generally embed distinct equipment items for the IFF and the ADS-B. These equipment items have analog head filters designed to achieve the rejection levels defined by the standards, by cascading a significant number of bandpass filters of diverse technologies (ceramic cavities, SAW (acronym for Surface Acoustic Wave) filters, BAW (acronym for Bulk Acoustic Wave) filters, et cetera).

Some equipment items, like the TSC4000 from Thales, handle the reception of the IFF interrogations and of the ADS-B messages in the same equipment item. However, such receptions are done on two separate radio chains.

Embedding two distinct reception equipment items or two separate reception chains in an aircraft to perform the IFF reception and ADS-B reception functions has obvious consequences in terms of volume and weight, which may not be compatible with aircraft of small sizes. Furthermore, the consumption of the equipment items is not optimal, which is a major drawback for applications of drone type. Finally, the components of each reception chain are relatively expensive, and the greater their number, the greater the series cost.

SUMMARY OF THE INVENTION

One aim of the invention is therefore to describe an equipment item that has a single reception chain making it possible to continuously receive the IFF interrogations around the 1030 MHz frequency and the ADS-B transmissions around the 1090 MHz frequency, while observing the normative constraints associated with these receptions.

To this end, the present invention describes a reception chain configured to allow the reception of IFF signals received in a frequency band centred on the 1030 MHz frequency and ADS-B signals received in a frequency band centred on the 1090 MHz frequency, and to reject at least one frequency band comprised between the 1030 MHz frequency and the 1090 MHz frequency. The reception chain according to the invention comprises:

- a reception antenna configured to receive a radiofrequency signal in a frequency band comprising the 1030 MHz and 1090 MHz frequencies,
- an analog part with:
  - a two-band filtering device configured to filter the radiofrequency signal acquired on the reception antenna by allowing passage around the frequency bands of the IFF and ADS-B signals while rejecting said frequency band comprised between the 1030 MHz frequency and the 1090 MHz frequency,
  - a low-noise amplifier configured to amplify the radiofrequency signal filtered by said two-band filtering device,
  - a mixer configured to mix the signal amplified by the low-noise amplifier with a sinusoidal signal so as to transpose the signals received on the frequency bands of the IFF and ADS-B signals to lower frequency bands,
  - an analog-digital converter configured to digitize the signals received on said lower frequency bands.

It also comprises a digital part configured to duplicate the digitized signal, and to process the duplicated signals respectively on:

- a first path comprising a first filtering device and a first frequency transposition device, configured to filter and transpose to a working frequency the signals received around the frequency bands corresponding to the IFF signals transposed by said mixer, and further comprising IFF signal processing means,
- a second path comprising a second filtering device and a second frequency transposition device, configured to filter and transpose to a working frequency the signals received around the frequency bands corresponding to the ADS-B signals transposed by said mixer, and further comprising ADS-B signal processing means.

According to one embodiment of the reception chain according to the invention, the two-band filtering device is a two-band filter.

According to one embodiment of the reception chain according to the invention, the two-band filtering device is configured to reject, by at least 30 dB, the signals received in said frequency band comprised between the 1030 MHz frequency and the 1090 MHz frequency.

Advantageously, the two-band filtering device, the first filtering device and the second filtering device are configured to reject together, by at least 60 dB, signals received outside of the reception frequency bands of the IFF and ADS-B signals.

According to one embodiment of the reception chain according to the invention, the frequency band comprised between the 1030 MHz frequency and the 1090 MHz frequency comprises the 1053 MHz-1065 MHz frequency band.

According to one embodiment of the reception chain according to the invention, the sinusoidal signal used by the mixer to mix the signal amplified by the low-noise amplifier is a sinusoidal signal whose frequency is substantially equal to 1050 MHz or 1070 MHz.

According to one embodiment, the reception chain according to the invention further comprises one or more bandpass or low-pass filters configured to reject intermodulation lines generated by at least one out of the mixer, the first frequency transposition device and the second frequency transposition device.

According to one embodiment, the reception chain according to the invention further comprises means for oversampling and adjusting the power level of the signals digitized by the analog-digital converter.

BRIEF DESCRIPTION OF THE DRAWINGS

The invention will be better understood and other features, details and advantages will become more apparent on reading the following description, given as a nonlimiting example, and using the attached figures, given by way of example, in which.

DETAILED DESCRIPTION

Figure 1:
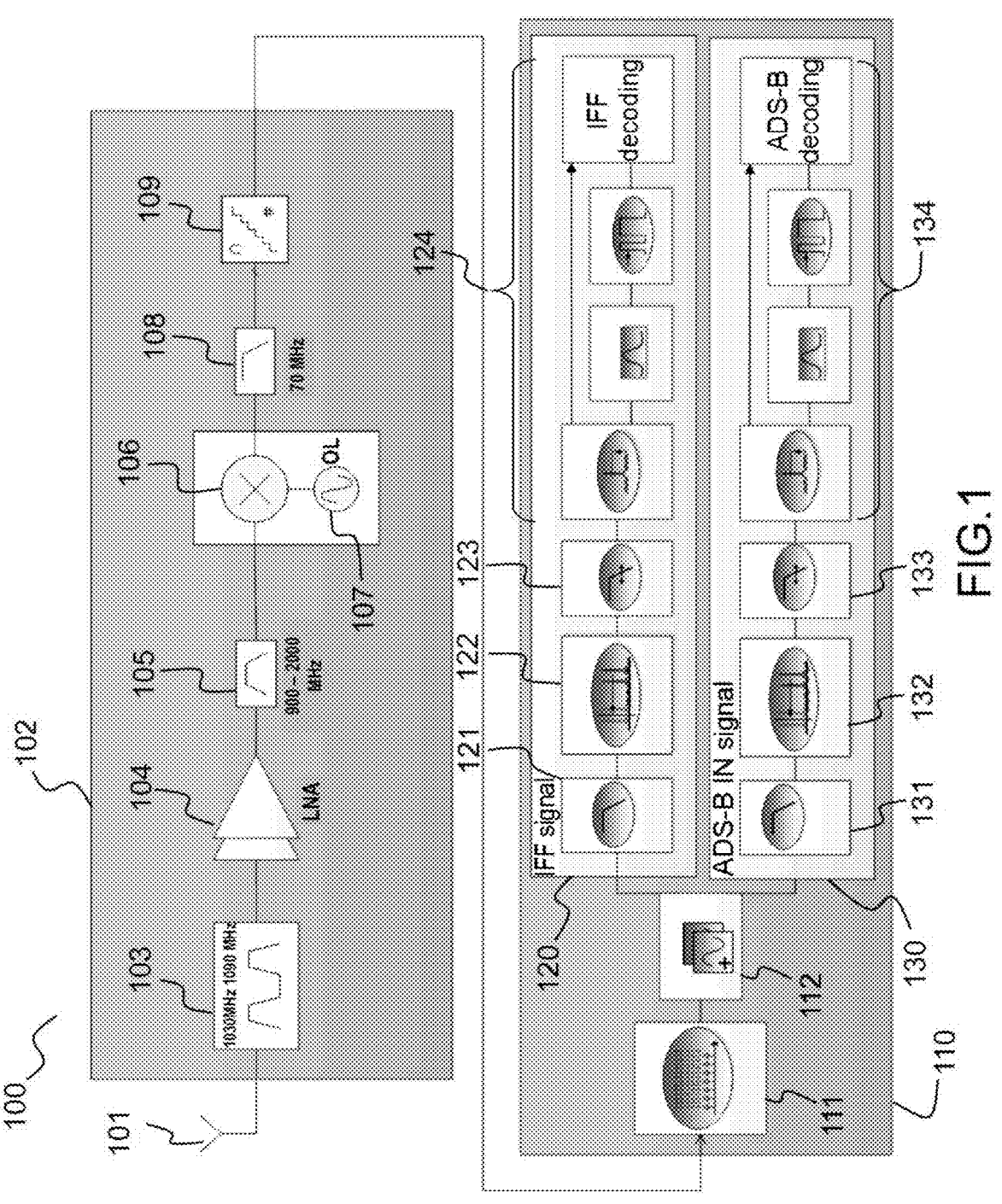
FIG. 1 represents a functional block diagram of a reception chain 100 according to an embodiment of the invention.

There are many ways to produce an IFF or ADS-B reception chain. In all cases, the radio signal, whether it is centred around the 1030 MHZ frequency or the 1090 MHz frequency, is filtered then amplified using a low-noise amplifier, then filtered again, the filters being necessary to meet the rejection constraints of the standards DO-260, AIMS 03-1000 and ED73. Next, the signal is either directly digitized, or converted into a video signal and then digitized.

The receivers can be heterodyne or homodyne, and the digitization of the signal is done in low intermediate frequency, either directly on the radio signal, or on a video signal produced from the radio signal.

The historical solution consists in performing a heterodyne reception of the signal, in converting it into a video signal on a low intermediate frequency, then in digitizing the video signal. The conversion of the signal into a video signal consists in working only on the logarithmic envelope of the signal. The benefit of this solution is that it is inexpensive and not processing-intensive, and this is why it is a solution that is still used, despite its bulk.

Another solution consists in directly digitizing the IFF or ADS-B signals on their carrier frequency, using very powerful and very efficient ADCs. This solution is however expensive to implement, and means that the ADCs are considered as critical complex components that have to meet the certification constraints specified in aeronautics (standard DO-284), and this is why it is little used in aeronautical components.

The more recent solutions consist in digitizing all of the radio signal received in the form of I/Q signals. These solutions, whether they are derived from a heterodyne reception or from a homodyne reception, make it possible to implement more powerful digital processing operations since there is no loss of information linked to the conversion of the signal into a video signal.

Designing a radio chain that allows the simultaneous reception of the IFF and ADS-B signals, with a stable filtering in the frequency bands of interest and that observes the normative constraints on the rejection levels of the signals outside of these bands, proves to be particularly difficult. Indeed, while it is possible to design analog filters that make it possible to achieve the desired rejection levels around one or other of the IFF or ADS-B frequency bands, designing analog filters that pass and are stable simultaneously around the two frequencies of interest while guaranteeing the required rejection levels (greater than 60 dB) outside of these bands, and in particular in the intermediate frequency band, requires the use of filters of particularly high orders. Such filters are particularly complex and costly to produce, exhibit in-band ripple problems, and have significant weight and volume.

The production of a digital filter of high order that passes and is stable on the two frequency bands of interest and that has the desired rejection properties is theoretically possible. However, such a filter would be positioned in the reception chain after the ADC (Analog-Digital Converter), which consequently would not be protected against the high level emissions that take place in frequency bands close to those of the IFF and of the ADS-B, in particular those received in the frequency band situated between the two bands of interest. These non-rejected transmissions can have the effect of making the ADC work at saturation. In practice, the saturation of the ADC leads to a non-linear distortion which at the very least creates a wideband spectral noise, which destroys the dynamic range of the receiver, and at worst will lead to a deterioration thereof.

In order to mitigate the defects of the state-of-the-art, and given the constraints presented hereinabove, the invention defines a hybrid analog-digital radio reception chain that has:

a first, two-band analog filtering level, intended to apply a part of the desired rejection of the signals situated outside of the bands of interest, in particular those received between the IFF signal and the ADS-B signal, in order to avoid the saturation of the ADC linked to non-essential radiations, then a second, digital filtering level, matched to one or other of the signals of interest, configured such that the two filtering levels together make it possible to achieve the normative demands.

FIG. 1 represents a functional block diagram of a reception chain 100 according to an embodiment of the invention, allowing the simultaneous reception of IFF (1030 MH) and ADS-B (1090 MHZ) signals.

It comprises a reception antenna 101, configured to receive a radiofrequency signal in a frequency band comprising the IFF and ADS-B signals, that is to say the 1030 MHz and 1090 MHz frequencies.

Next, it comprises an analog part 102 configured to apply head processing operations to the received signals, to the digitization thereof.

To this end, the analog part 102 of the radio chain 100 according to an embodiment of the invention comprises a two-band filtering device 103, configured to filter the radiofrequency signal acquired on the reception antenna 101, passing around the frequency bands of the IFF signals (centred around 1030 MHZ) and ADS-B signals (centred around 1090 MHz) and rejecting the signals outside of these bands, in particular those situated in the intermediate frequency band.

According to one embodiment of the invention, the two-band filtering device 103 can comprise one or more cascaded bandpass analog filters, intended to filter the signal around the IFF frequency band (1030 MHZ), and around the ADS-B frequency band (1090 MHZ).

According to another embodiment, the two-band filtering device 103 can be produced by a diplexer that separates the signal into two channels, each channel being filtered using a bandpass filter intended to filter the signals around the IFF (1030 MHZ) and ADS-B (1090 MHZ) frequency bands, for example the BAW filters 880367 and 880374 from QORVO. The two channels are then recombined using a combiner. The diplexer and the combiner are produced so as to guarantee the good matching of each channel with respect to the other with both the IFF (1030 MHZ) and ADS-B (1090 MHz) frequencies of interest, for example using quarter-wave lines, whether loaded or not.

According to another embodiment of the invention, more advantageous because it is more compact and simpler to produce, the two-band filtering device 103 can take the form of a two-band analog radio filter. This analog filter contributes to the rejection of the signals outside of the IFF and ADS-B bands, but is not held by the constraints defined by the standards, which is why its mask can be more relaxed, thus making the production of such an analog filter possible.

Figure 2:
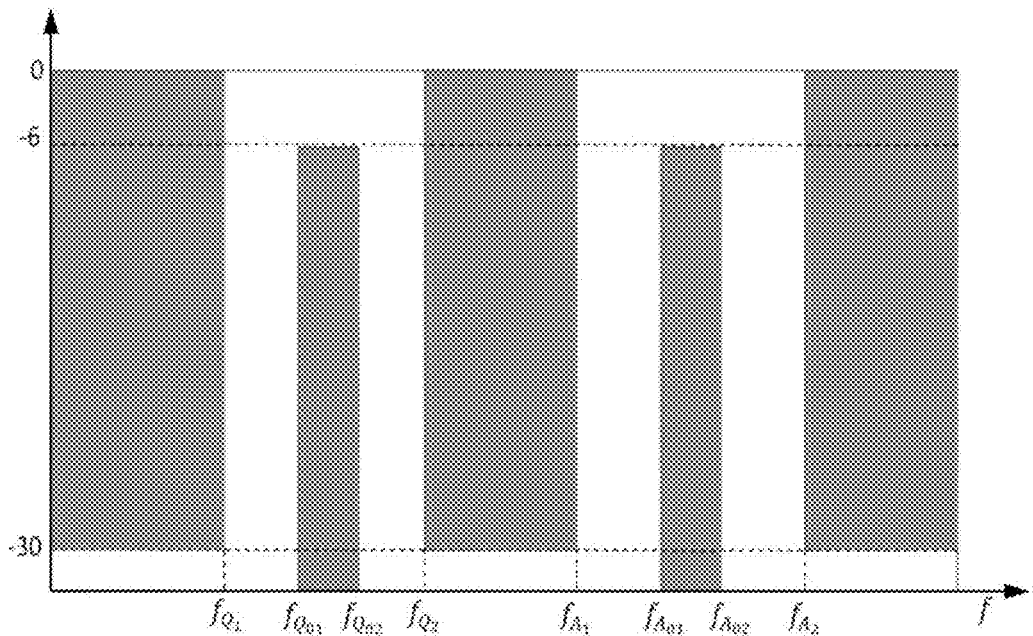
FIG. 2 gives an example of two-band analog filter mask that can be used for the implementation of a receiver according to an embodiment of the invention.

FIG. 2 gives an example of two-band analog filter mask 103 that can be used for the implementation of a receiver according to an embodiment of the invention.

This filter is defined as passing between the frequencies fQ1=1005 MHz and fQ2=1055 MHz, i.e. in the frequency band associated with the reception of the IFF signals. The oscillation of the signals in the sub-band fQ01=1016 MHz to fQ01=1044 MHz is limited to 6 dB, so as to minimise the deformations of the IFF signal.

This filter is also defined as passing between the frequencies fA1=1065 MHz and fA2=1115 MHz, i.e. in the frequency band associated with the reception of the ADS-B signals. The oscillation of the signals in the sub-band fQ01=1076 MHz to fQ01=1104 MHz is limited to 6 dB, so as to minimise the deformations of the ADS-B signal.

Outside of these two frequency bands, the rejection level of the filter is greater than 30 dB, in particular in the 1055 MHz-1063 MHZ frequency band, which makes it possible to ensure a rejection that is sufficient to avoid the phenomenon of saturation of the ADC by signals transmitted in this frequency band.

The analog part 102 of the radio chain 100 according to an embodiment of the invention also comprises a low-noise amplifier 104 configured to amplify the radiofrequency signal filtered by the two-band filtering device 103. Advantageously, the amplifier can be followed by a bandpass filter 105 configured to reject signals away from the frequency bands of interest. In the example of FIG. 1, the bandpass filter 105 passes on a fairly wide frequency band ranging from 900 MHz to 2 GHz.

The analog part 102 of the radio chain 100 according to an embodiment of the invention next comprises a mixer 106 configured to mix the signal amplified by the low-noise amplifier (and possibly filtered by the filter 105) with a sinusoidal signal 107, so as to transpose the signals received on the frequency bands of the IFF and ADS-B signals to lower frequency bands that can be digitized by the analog-digital converter. Such a mixer is characteristic of a heterodyne receiver. The frequency of the sinusoidal signal 107 is chosen so as to avoid the phenomenon of interleaving of the IFF and ADS-B intermodulation lines.

An advantageous frequency for the sinusoidal signal is a frequency close to 1050 MHz, which makes it possible to transpose the IFF signal to the 20 MHz frequency and the ADS-B signal to the 40 MHz frequency while avoiding the appearance of the intermodulation lines in the frequency bands of interest.

Another advantageous frequency for the sinusoidal signal is a frequency close to 1070 MHz, which makes it possible to transpose the IFF signal to the 40 MHz frequency and the ADS-B signal to the 20 MHz frequency while avoiding the appearance of intermodulation lines in the frequency bands of interest.

Other frequencies are possible, except for the frequencies close to 1060 MHz which would have the effect of making IFF signal intermodulation lines appear in the frequency band of the ADS-B signal and vice versa. In particular, the frequency can be lower than the 1030 MHz frequency, or greater than the 1090 MHz frequency, as long as the frequencies to which the signals of interest are transposed are compatible with the ADC.

According to an advantageous embodiment of a reception chain 100 according to the invention, the transposition of the signals is followed by a filtering 108, the object of which is to eliminate intermodulation lines resulting from the frequency transposition, as for example in the case of a transposition with a sinusoidal signal at 1050 MHZ, a low-pass filter having a cut-off frequency of 70 MHz.

Finally, the analog part 102 of the radio chain 100 according to an embodiment of the invention comprises an analog-digital converter (ADC) 109 configured to digitize the transposed IFF and ADS-B signals. The sampling speed of the ADC is chosen as being at least two times greater than the frequency of the highest transposed signals, so as to observe the Shannon theorem. The ADC is chosen in such a way that its noise figure is compatible with the performance levels expected on reception.

The reception chain 100 also comprises a digital part 110 configured to provide the additional filtering needed to hold to the normative constraints, and to process the IFF and ADS-B signals. This digital part can be implemented by computation means such as, for example, a microprocessor, a DSP (acronym for Digital Signal Processor), an FPGA (acronym for Field Programmable Gate Array), an ASIC (acronym for Application-Specific Integrated Circuit), any combination of these means, or any hardware component making it possible to perform the processing operations of the digital part 110 described hereinbelow.

According to an advantageous embodiment of the invention, the digital part 110 is configured to implement optional processing operations 111 of oversampling and adjusting the power of the received signals. The oversampling of the received signals makes it possible to reduce the sampling rate of the ADC 109, and thus to reduce its consumption. The adjustment of the power of the signals makes it possible to position their dynamic range best in order to apply the subsequent processing operations in optimal arrangements. Alternatively, the oversampling can be performed later in the digital part.

The digital part 110 is further configured to perform a duplication 112 of the signals, and to process them according to two separate paths:

a first path 120, in which processing operations allowing the interpretation of the IFF signals are implemented, a second path 130, in which processing operations allowing the interpretation of the ADS-B signals are implemented.

The duplication 112 consists in copying the digitized signals (and possibly the signals oversampled and adjusted in power).

Each of the paths comprises a filtering device 121/131 and a frequency transposition device 122/132.

The filtering devices 121/131 are configured to filter the signal around the transposed frequency of interest (the 20 MHz frequency for the path 120 associated with the IFF signal and the 40 MHz frequency for the path 130 associated with the ADS-B signal in the case of a mixing 106 with a sinusoidal signal 107 at the 1050 MHz frequency). These filterings complement those performed by the analog filter 103, and are defined in such a way that these filters together provide the rejection levels defined by the standards DO-260, AIMS 03-1000 and ED73. They can be different on the IFF path 120 and on the ADS-B path 130, and are matched to the spectral mask of the signals processed on each path. In particular, they ensure, complementing the head two-band filter 103, a rejection greater than 60 dB of the signals received in the 1053 MHZ-1065 MHz frequency band.

In the case of a mixing 106 with a sinusoidal signal 107 at the 1050 MHz frequency, the filter 121 can for example be a low-pass filter rejecting by more than 30 dB the signals situated above the 25 MHz frequency. Similarly, in the same case of application, the filter 131 can for example be a bandpass filter rejecting by more than 30 dB the signals situated outside of a 50 MHz frequency band centred on the 40 MHz frequency.

The frequency transposition devices 122/132 are configured to transpose the signals to working frequencies, that is to say operating frequencies that make it possible to implement subsequent signal analysis processing operations. For example, in the case of a mixing 106 with a sinusoidal signal at the 1050 MHz frequency, the carrier frequency of the signals for the path 120 associated with the IFF signal is 20 MHZ and is 40 MHz for the path 130 associated with the ADS-B signal. The frequency transposition device can then take the form of an I/Q demodulator, configured to transpose the signals to the baseband and convert them into IQ samples. Alternatively, the frequency transposition device can be a mixer configured to transpose the signals to a carrier frequency suited to the processing of the IFF or ADS-B signals. The working frequencies of the IFF signal and of the ADS-B signal are not necessarily identical. Advantageously, the frequency transposition devices 122 and 132 can be followed by a low-pass filter 123/133 configured to eliminate intermodulation lines linked to the transposition of the signals.

On each path, the positions of the filtering device 121/131 and of the frequency transposition device 122/132 can be reversed. In the case of a baseband transposition, the filtering devices 121/131 can be low-pass filters. However, the arrangement presented in FIG. 1 is advantageous since it avoids the appearance of intermodulation lines linked to the presence of the ADS-B signal on the path 120 of the IFF signal and vice versa.

Finally, each path comprises means 124/134 for processing demodulated samples. These processing operations are not described here in detail because they correspond to the processing operations known from the state-of-the-art that make it possible to decode IFF or ADS-B signals, namely the computation of cross-correlation products, the conversion of the signals into video signals, and the search for pulses in these signals.

The reception chain according to the invention therefore makes it possible to receive IFF signals and ADS-B signals in a combined way in a compact solution. It has an analog part and a digital part, that are configured to together achieve the rejection performance levels defined by the standards DO-260 B and C, AIMS 03-1000 and ED73 E and F. It is distinguished from the reception chains of the state-of-the-art in that the rejection is provided both by:

an analog filter situated at the processing head, intended to protect the ADC from signals that can have the effect of saturating it, in particular signals transmitted in the frequency band situated between the frequency band of the IFF signals and the frequency band of the ADS-B signals, digital filters situated after the ADC, that are intended to provide the additional filtering required to allow the IFF and ADS-B receptions.

It provides:

a better management of the reception, through the shifting of filtering and demodulation functionalities to the digital part. Indeed, the digital processing operations are more stable, and it is simpler to adjust digital processing operations than hardware components, and a reduction at the very least by a factor of two of the surface area of the IFF and ADS-B reception functions, of the number of components, of the weight, of the consumption and of the number of antennas, which is critical for small aircraft and makes it possible to reduce the costs.

The invention claimed is:

1. A reception chain configured to allow the reception of IFF signals received in a frequency band centred on the 1030 MHz frequency and of ADS-B signals received in a frequency band centred on the 1090 MHz frequency, and to reject at least a frequency band comprised between the 1030 MHz frequency and the 1090 MHz frequency, wherein it comprises:

a reception antenna configured to receive a radiofrequency signal in a frequency band comprising the 1030 MHz and 1090 MHz frequencies, an analog part with:

a two-band filtering device configured to filter the radiofrequency signal acquired on the reception antenna by allowing passage around the frequency bands of the IFF and ADS-B signals while rejecting said frequency band comprised between the 1030 MHz frequency and the 1090 MHz frequency, a low-noise amplifier configured to amplify the radiofrequency signal filtered by said two-band filtering device, a mixer configured to mix the signal amplified by the low-noise amplifier with a sinusoidal signal so as to transpose the signals received on the frequency bands of the IFF and ADS-B signals to lower frequency bands, an analog-digital converter configured to digitize the signals received on said lower frequency bands, a digital part configured to duplicate the digitized signal, and to process the duplicated signals respectively on:

a first path comprising a first filtering device and a first frequency transposition device, configured to filter and transpose to a working frequency the signals received around the frequency bands corresponding to the IFF signals transposed by said mixer, and further comprising IFF signal processing means, a second path comprising a second filtering device and a second frequency transposition device configured to filter and transpose to a working frequency the signals received around the frequency bands corresponding to the ADS-B signals transposed by said mixer, and further comprising ADS-B signal processing means.

2. The reception chain according to claim 1, wherein said two-band filtering device is a two-band filter.

3. The reception chain according to claim 1, wherein the two-band filtering device is configured to reject by at least 30 dB the signals received in said frequency band comprised between the 1030 MHz frequency and the 1090 MHz frequency.

4. The reception chain according to claim 1, wherein the two-band filtering device, the first filtering device and the second filtering device are configured to reject together by at least 60 dB signals received outside of the reception frequency bands of the IFF and ADS-B signals.

5. The reception chain according to claim 1, wherein said frequency band comprised between the 1030 MHz frequency and the 1090 MHz frequency comprises the 1053 MHZ-1065 MHz frequency band.

6. The reception chain according to claim 1, wherein said sinusoidal signal used by the mixer to mix the signal amplified by the low-noise amplifier is a sinusoidal signal whose frequency is substantially equal to 1050 MHz or 1070 MHz.

7. The reception chain according to claim 1, further comprising one or more bandpass or low-pass filters configured to reject intermodulation lines generated by at least one out of the mixer, the first frequency transposition device and the second frequency transposition device.

8. The reception chain according to claim 1, further comprising means for oversampling and adjusting the power level of the signals digitized by the analog-digital converter.

* * * * *